Jan 6, 1931.  H. LAFFON  1,787,484
PHONOGRAPH DISK
Filed Feb. 4, 1928
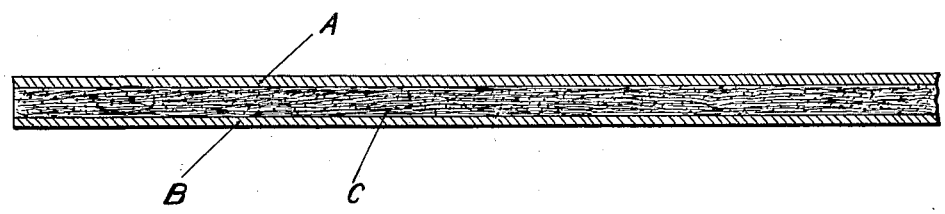
Applicant:-
Hubert Laffon
By. Mauro+Lewis
Attorneys Patented Jan. 6, 1931

1,787,484

UNITED STATES PATENT OFFICE

HUBERT LAFFON, OF PARIS, FRANCE

PHONOGRAPH DISK

Application filed February 4, 1928, Serial No. 252,058, and in France March 17, 1927.

My invention relates to phonograph disks and to a process for their preparation and moulding and especially to disks such as illustrated by the fragmentary sectional view of the accompanying drawing.

The essential characteristic of the said invention resides in the production of disks of the character indicated comprised of three layers of superposed materials intimately bound together, the two external layers A and B having a coefficient of expansion different than the intercalary layer C, and the said intercalary layer of material being in substance more plastic and consequently more susceptible to softening under the influence of heat than the external layers of material. The three layers composing the disk have nearly the same composition, each containing cellulose ester; but the intercalary layer has a coefficient of expansion different from that of the external layers due to the fact that it is made in part of an inert filling material.

Disks constructed in this manner and according to the invention and the properties of the materials above mentioned of which the disks are composed can be easily moulded by pressure and under heat between two matrices carrying in relief on their surfaces the grooves which it is desired to imprint in intaglio on each face of the said disks. At the time of the said moulding operation under pressure and heat, the projections on the matrices imprint grooves in intaglio in each external layer of hard material of the disk, due to the fact that the internal layer of plastic material, forming an elastic support for the external layers, favors the said hollowing operation of the external layers by giving way more or less under the action of the projection imprinting the grooves in the said layers. The said grooves are consequently reproduced on the interior of the said plastic layer with an intensity which becomes less from the surface toward the center.

It will likewise be perceived that disks constructed in the manner indicated do not warp by reason of the difference between the coefficient of expansion of the outer layers A and B and that of the inner layer C going to make up the disk and at the same time present the desired degree of rigidity. The said disks are furthermore absolutely unbreakable.

The internal layer of plastic material C may be of a substance having a cellulosic ester base mixed with a more or less large quantity of a suitable plasticizing substance in order to impart the desired degree of plasticity thereto by lowering the fusing point thereof and eventually mixing with an inert or suitable loading material.

Hence there might also be considered the formation of the internal layers of the disks of cellulosic ester more or less diluted with a plasticizing material and without any loading material and in this manner layers of the character mentioned could be readily produced which would be entirely transparent and very light but whose net cost would be relatively high.

The addition of a certain quantity of loading or auxiliary material, such as colored pigments, for example to the materials constituting the said layers permits the coloring of the said internal layers if desired.

In contradistinction, if cheaper disks are desired to be obtained, then more importance is given to the loading or inert material by utilizing cardboard, wood fiber, cellulose or analogous inert material therein which is impregnated subsequently with cellulosic ester more or less diluted, if necessary, with a plasticizer in order to give the whole the desired degree of plasticity. The inert or loading cardboard or analogous material thus gives the whole the desired mechanical rigidity and the subsequent impregnation assures the degree of plasticity thereof.

As plasticizers, any of the well known plasticizing materials such as, resinic ether, ethyl-phthalate, triphenylphosphate and the like may be employed.

The hard external layers of material A and B, between which is disposed the said internal plastic layer C, and upon which are directly formed the grooves by moulding, must present the following characteristics:

Be rather plastic for taking the form of the impressions of the mould, under heat.

Capable of resisting scratching by the needle of the phonograph.

Must not allow a change in the cross section of the grooves by subsequent evaporation of one of its constituent materials, for example.

Must not adhere to the mould at the time of moulding.

Must prevent all warping of the disks.

As a basic material for the said external layers, any cellulosic varnish known in the art and capable of fulfilling the preceding conditions may be employed and is used either in a pure state or with the addition of suitable loading materials, such as colored pigments or the like, for giving thereto the desired coloration.

In making the disks conforming to my invention, after cutting out the internal plastic layer C to the form and dimensions desired, I cover the said internal layer on its two surfaces with varnish adapted to form the external layers by any of the processes known in the art, such as, immersion, coating with a brush, or by the application of a film of varnish or the like.

I might, among other things, for example, superpose on each face of the internal plastic layer, a film of varnish prepared on some sort of a metallic support, and to which is given by heating, a slight momentary degree of plasticity, sufficient, however, to allow the varnish to penetrate into the mass of the said internal layer. There is thus no loss of varnish by penetration in the internal layer and as a result there is realized a saving in raw material.

Before the setting of the external layer of varnish on each of the faces of the internal layer C, I may imprint thereon, by any of the processes known to the art, all sorts of vignettes, wording, designs, musical themes and the like as desired by way of advertisement or the like. The said impression remains visible through the varnish and if the external layer is transparent, may even be seen by transparency on the two surfaces of the disk. If the internal layer thereof is composed of impregnated cardboard, for example, impression of the cardboard will preferably take place before impregnation and above all before varnishing the exterior.

While various formulæ may be conceived for carrying the invention into practice, I prefer to manufacture my disks according to the following examples given by way of a nonlimiting illustration.

*Example 1*

A sheet of cardboard is selected of the desired thickness (2 to 3 millimeters, for example) and before or after cutting to the shape and dimension desired, the said cardboard is impregnated with the following composition:

|  | Parts |
|---|---|
| Nitrocellulose | 6 |
| Triacetine | 4 |
| Damar gum | 6 |
| Ethyl acetate | 30 |
| Acetone | 54 |

The disks thus obtained are then coated, by means of any process known to the art, with one of the two following varnish compounds:

|  | Parts |
|---|---|
| 1. Nitrocellulose | 6 |
| Triacetine | 1 |
| Tricresylphosphate | 2 |
| Butyl-acetate | 40 |
| Acetone | 60 |

(with or without the addition of a loading material).

|  | Parts |
|---|---|
| 2. Cellulose acetate | 10 |
| Triacetine | 3 |
| Triphenylphosphate | 1 |
| Acetone | 86 |

(with or without the addition of a loading material).

There is thus obtained a thick non-transparent disk ready for moulding.

*Example 2*

A thin plate is prepared by casting, moulding, pressing in block and scraping or any other process known to the art, from the following composition:

|  | Parts |
|---|---|
| Nitrocellulose | 80 |
| Triacetine | 30 |
| Triphenylphosphate | 10 |
| Castor oil | 10 |

(with or without the addition of a loading material).

Each of the surfaces of the disk thus obtained is subsequently coated with one or the other of the varnish compositions above indicated in Example 1.

After cutting out to the form desired very thin and light disks are obtained which can be made entirely transparent.

When the disks according to the invention are completely finished, that is to say, formed of three superposed layers of material intimately bound together and cut out to the diameter and the form desired, they are then ready for moulding which operation takes place on the finished bare disks.

The said moulding operation is brought about by compression of the disk under heat between two matrices carrying the grooves to be impressed in the face of the disk in relief, the said matrices being heated, for example, to about 100 to 130° C.

One advantage of my process lies in the increased facility in packing and shipping bare disks ready for moulding and their moulding in a different place than that of their manufacture and at any time thereafter. Disks may thus be sold bare and subsequently receive such impression as may be desired.

The bare disks, ready for moulding, such as those obtained by the above described processes, may likewise, in case of necessity, be on the contrary directly recorded in order to render first of all the external surface of the said disks sufficiently malleable by means of any preparation or suitable treatment for permitting direct penetration thereof by the recording stylus.

While I have described my process in what I deem to be its preferred form I do not wish to be limited thereto as there might be various changes in the expedients utilized therein, such as the compositions, the process of manufacture, the manner of inserting the advertising matter above indicated, without departing from the spirit of the invention comprehended within the scope of the appended claim.

Having thus described my invention what I claim as new and desire to secure by Letters Patent is:

Process for manufacturing phonograph disks of the type disclosed which comprises, selecting a suitable basic supporting material, shaping said material, impregnating said disks thus formed with cellulosic ester and a plasticizer, impressing the desired legend on said disks and subsequently coating the said disks with transparent cellulosic varnish.

In testimony whereof I have affixed my signature.

HUBERT LAFFON.